United States Patent [19]

Witwer

[11] Patent Number: 4,831,715
[45] Date of Patent: May 23, 1989

[54] METHOD AND APPARATUS FOR POSITIONING INTERMEDIATE INSULATORS IN CORES

[75] Inventor: Keith A. Witwer, Fort Wayne, Ind.

[73] Assignee: Industra Products, Inc., Indianapolis, Ind.

[21] Appl. No.: 472,718

[22] Filed: Mar. 7, 1983

[51] Int. Cl.⁴ ............................................. H02K 15/10
[52] U.S. Cl. ...................................... 29/596; 29/606; 29/734
[58] Field of Search ................. 29/596, 606, 732, 734, 29/736

[56] References Cited
U.S. PATENT DOCUMENTS

| | | | |
|---|---|---|---|
| 3,579,791 | 12/1969 | Arnold | 29/205 |
| 3,672,039 | 6/1972 | Arnold | 29/596 |
| 3,815,207 | 6/1974 | Habegger | 29/732 |
| 3,885,288 | 5/1975 | Lund | 29/205 |
| 4,090,290 | 5/1978 | Clark . | |
| 4,276,689 | 7/1981 | Urick et al. . | |
| 4,335,325 | 6/1982 | Miller et al. . | |
| 4,455,743 | 6/1984 | Witwer et al. | 29/596 |

FOREIGN PATENT DOCUMENTS 2135407 7/1971 Fed. Rep. of Germany .
109133 10/1974 Fed. Rep. of Germany .
1515477 6/1978 United Kingdom .

Primary Examiner—Carl E. Hall
Attorney, Agent, or Firm—Jeffers, Hoffman & Niewyk

[57] ABSTRACT

A coil placing machine having an improved operating sequence for positioning coil separating insulators in certain core slots is disclosed. The insulators are supported about a coil placing machine super structure and stripped therefrom into the respective slots by movement of the stator core into position for receiving coils from the placing machine. In the preferred apparatus a stator gage and blade aligning tool has a first portion for engaging blades of a coil placing apparatus and the second portion for axially and radially aligning a stator core with the coil placing apparatus as well as a portion intermediate the first and second portions for supporting insulators in a position to be transferred to a stator core by relative motion between the core and tool. With this arrangement, the motion normally required to position the stator core preparatory to receiving coils is also effective to locate the intermediate insulators in the stator core.

20 Claims, 3 Drawing Sheets

METHOD AND APPARATUS FOR POSITIONING INTERMEDIATE INSULATORS IN CORES

BACKGROUND OF THE INVENTION

The present invention relates generally to the insertion of prewound coils and insulators in magnetic cores such as dynamoelectric machine stator cores. More particularly, the present invention relates to a method and apparatus for placing coils and intermediate insulators in cores in which some coils are already positioned.

A number of machines have been devised for inserting prewound coils as well as, optionally, insulating wedges into stator cores. Illustrative of such machines are the Hill U.S. Pat. No. 3,324,536 and Walker et al., U.S. Pat. No. 3,402,462. Coil placing machines of this type typically include a plurality of generally parallel extending finger elements for supporting coils and a magnetic core into which the coils are to be placed along with a plurality of wedge guides adjacent portions of the finger elements for engaging the magnetic core. A stripper is reciprocable along finger elements to engage and move the coils into the magnetic core and insulating wedge push rods are reciprocable along the wedge guides to engage and force insulating wedges into the core slots radially inwardly of the coils.

While the placement of the insulating wedges which lie radially inwardly of the windings by the same machine which places those windings in the core slots is well established, the machine placement of so called phase insulators which function to separate one winding from another within the dynamoelectric machine stator is for several reasons substantially more difficult to achieve. Typically, such phase insulators will include end turn insulating sheets joined by leg portions intended to lie in the core slots intermediate the windings. Such phase insulators may for example be disposed intermediate the main and start windings of a single phase induction motor or between the several phase windings of a polyphase motor. Pat. illustrating various approaches to the machine insertion of phase insulators include Clark, U.S. Pat. No. 4,090,290; Urick et al., U.S. Pat. No. 4,276,689; and Miller et al., U.S. Pat. No. 4,335,325. These patented schemes have one or more of the following drawbacks: not being readily compatible with coil placing machines of the type illustrated in the above-referenced two patents or with more complex multiple process machines employing such coil placing devices as an integral part thereof; requiring a guide element to be positioned by the operator in the coil placer's tooling; requiring phase insulators having excessive leg length so that the end turn insulating portion of the phase insulator may be separated slightly from the stator at one or both ends thereof; requiring a separate phase insulator inserting step; the occasional tearing of an insulator; the occasional trapping of a portion of the insulator between the coil placing tooling and the stator core; the frequent failure of the leg portion of the phase insulator to adequately separate windings within a slot; and the inadequate reduction in overall dynamoelectric machine stator fabricating time.

Frequently, coil placing machines of the above-referenced type form a part only of a more complex coil winding and placing device as illustrated for example by U.S. Pat. Nos. 3,625,261 and 3,828,830 both to Hill et al. as well as copending U.S. application Ser. No. 294,210, filed Aug. 17, 1981, in the name of Witwer et al. The principles and techniques of the present invention are applicable to a wide variety of coil placing devices of the types referred to above as well as others. Reference may be had to any of the aforementioned patents for details of the machine operation generally.

The copending Witwer and Walker application Ser. No. 429,470 filed Sept. 30, 1982 and entitled "Method and Apparatus For Placing Coils and Intermediate Insulators in Cores" discloses approaches for significantly reducing the above-noted prior art deficiencies. In that application, which is assigned to the assignee of the present invention, a stripper for urging coils axially toward and into a stator core and a further member for urging intermediate insulators into that core commence movement together with the stripper subsequently interrupting its motion to allow the other member to complete placement of the intermediate insulators whereupon the stripper resumes its movement to insert the coils into the core. While this prior system works well in practice, no part of the coil or insulator inserting sequence can commence until the stator core is positioned on the inserter tooling and clamped in place. The time required for placing stator cores in their coil receiving position is dedicated to that task in the sense that commencement of the insertion step must await completion of the stator positioning step. Also, the stator assembling machine parts which effect the temporary interruption of stripper movement during the insertion process add to the overall cost of the stator assembling machine.

Reference may be had to any of the aforementioned patents or patent applications for details of the stator assembling machine and machine operation and the entire disclosures of the two aforementioned Witwer et al. applications are specifically incorporated herein by reference.

SUMMARY OF THE INVENTION

Among the several objects of the present invention may be noted an overall reduction in dynamoelectric machine assembly time as compared to the above-referenced prior art; the provision of an improved coil and intermediate insulator inserting sequence; the accomplishing of another task during performance of the task of positioning a stator core for receipt of coils from a coil insertion device; the provision of a stator assembling machine capable of expeditiously completing the task of positioning intermediate insulators within stator core slots prior to initiation of the placement of certain coils within slots of that stator core; the provision of a stator gauge and blade aligning tool which facilitates placement of intermediate insulators in stator core slots; and the provision of an improved method of positioning intermediate insulators within stator core slots. These as well as other objects and advantageous features of the present invention will be in part apparent and in part pointed out hereinafter.

In general a stator gauge and blade aligning tool has a first portion for engaging blades of a coil placing device, a second portion for axially and radially aligning stator cores with blades of the coil placing device and a portion intermediate the first and second portions for supporting insulators in position to be transferred to a stator core by relative motion between the core and tool. Desirably, this relative motion is the same motion required for placement of the stator core in position on a stator assembling machine.

Also in general and in one form of the invention an improved method of positioning intermediate insulators in selected core slots utilizing stator assembling machinery having a super structure for receiving the intermediate insulators and for facilitating stator core positioning preparatory to coil insertion is accomplished by moving the core over the super structure to engage and strip insulators therefrom and to urge those insulators outwardly into their respective selected slots. Ideally, insulator positioning is completed prior to initiating coil insertion.

BRIEF DESCRIPTION OF THE DRAWING

Corresponding reference characters indicate corresponding parts throughout the several view of the drawing.

The exemplifications set out herein illustrate a preferred embodiment of the invention in one form thereof, and such exemplifications are not to be construed as limiting in any manner the scope of the disclosure or the scope of the invention.

DETAILED DESCRIPTION OF THE PREFERRED EMBODIMENT

Figure 1:
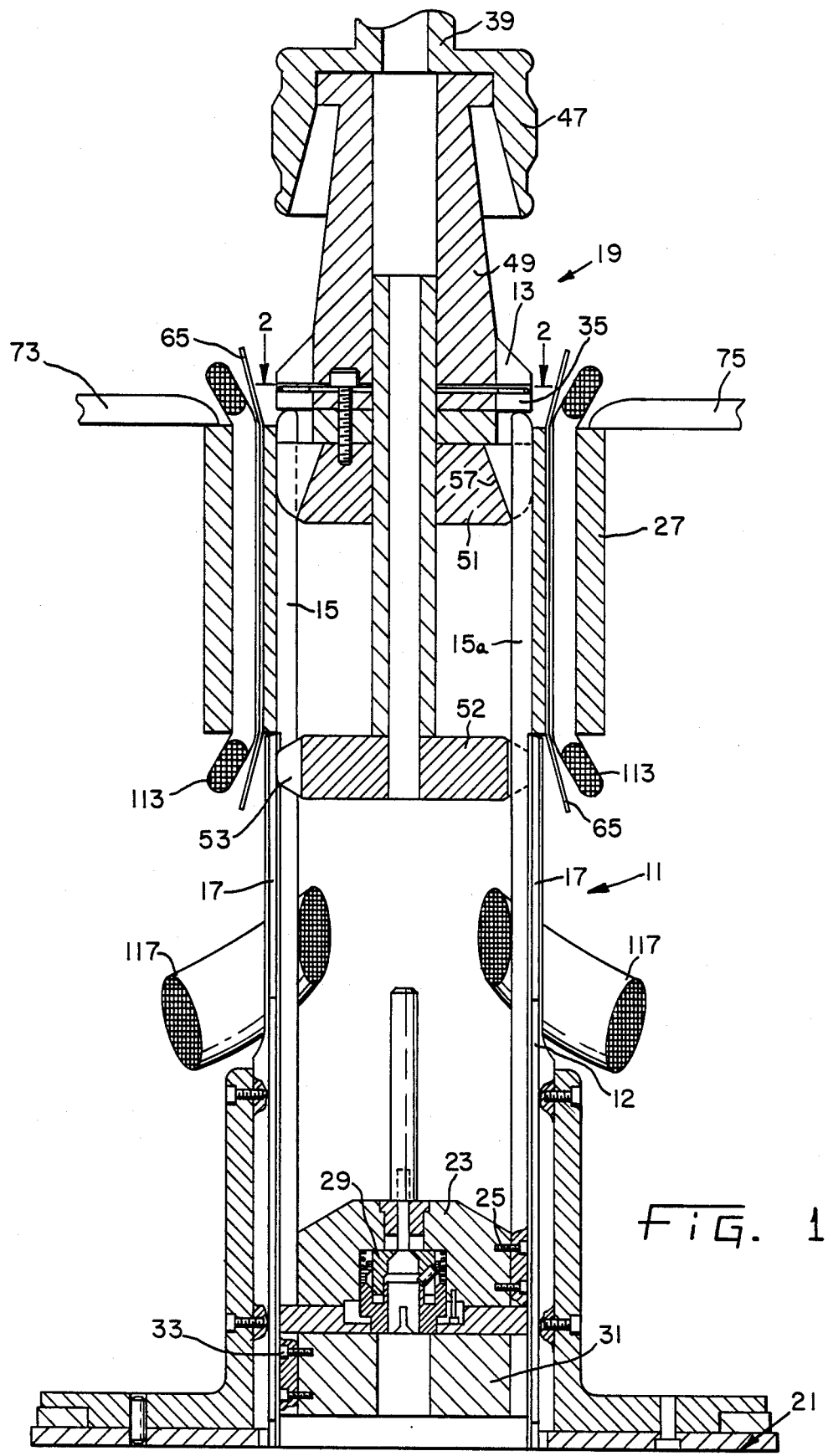
FIG. 1 is a side elevational view in section of the tooling of a coil placing machine including stator gauge and blade aligning superstructure.

Referring first to FIG. 1 the coil placer tooling 11 may for example be supported on a rotatable turntable which moves tooling 11 between a position where coils are wound and located between pairs of blades or finger elements such as 15 and between corresponding wedge guides such as 17 and a location where preformed wedges 12 are positioned between certain pairs of the wedge guides 17 and finally to a location in axial alignment with the insulation positioning member 19 which also functions as a stator gauge and blade aligning tool. The upper tooling 11 may be rotatable under control of a drive gear 21 for receiving more than one coil or winding and will typically include, in addition to the finger elements such as 15 and wedge guides such as 17, a stripper 23 which may as illustrated in the Donovan U.S. Pat. No. 3,689,976 have certain alternate ones of the blades or finger elements 15a attached thereto for movement therewith as by screws such as 25, or stripper 23 may be movable relative to all of the blades such as 15. In either case the function of stripper 23 is to engage the prewound coils leading them through a stator core and urging side turn portions of those coils into corresponding slots of that core. Stripper 23 is actuated or controlled by a stripper drive rod and coupled thereto by the disconnect coupling 29. The upper tooling 11 additionally includes an axially movable blade support member 31 which may support all or as illustrated only certain alternate ones of the blades such as 15 which would be fastened thereto by bolts or screws such as 33.

The insulation positioning member 19 includes, in addition to the actuating rod 39, a gauge tool portion 47 which aids in maintaining proper alignment with a magnetic core, a frustoconical portion 49 for supporting the lead end portions of phase insulators and blade alignment portions 51 and 52 including fins such as 53 which extend between adjacent finger elements 15.

The stator gauge and blade aligning tool 19 includes a first portion in the form of an upper blade aligning tool 51 and a lower blade aligning tool 52 which engages the blades 15 to maintain proper alignment and separation of those blades during the coil inserting process. Tool 19 also includes a second portion 47 which functions to axially and radially align stator cores with the coil placing apparatus blades when such stator cores are placed on the tooling for receiving coils. Tool 19 also includes an intermediate portion for supporting insulators such as the one illustrated in FIG. 5 in position to be transferred to a stator core 27 by relative motion between the core and tool in a manner to be described more completely in conjunction with FIG. 4. The intermediate portion of the tool 19 includes a first frustoconical insulation end support 49 having a gradual taper in the axial direction and a second frustoconical insulation end support 13 having a substantially more abrupt taper in the axial direction. This more abrupt taper which aids ultimate placement of the insulators in the stator core slots may be on the order of 45° to the axis of the tool. The outermost edge of this abruptly tapered portion 13 has an outside diameter only slightly less than the diameter of the bore in the stator core. Both the abruptly sloped intermediate portion 13 and the upper blade alignment tool 51 may be slotted for receiving insulator portions as best seen in FIGS. 2 and 3.

Figure 2:
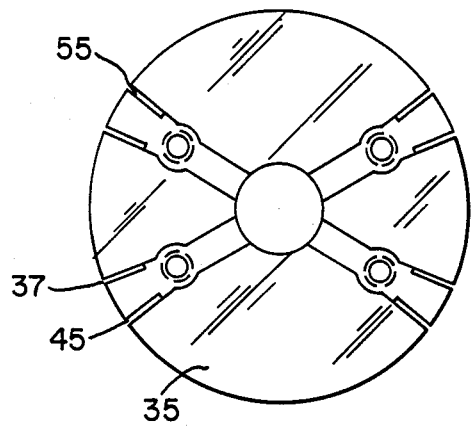
FIG. 2 is a cross-sectional view taken along the lines 2—2 of FIG. 1.

FIG. 2 actually depicts the spring retaining ring 35 of the intermediate portion, however, the slots such as 37, 45 and 55 continue through the abruptly tapered section 13 as well as extending downwardly into the upper portion 51 of the blade alignment tool, however, in the blade alignment tool 51 the slots are not axial but rather taper along the edge 57.

Figure 5:
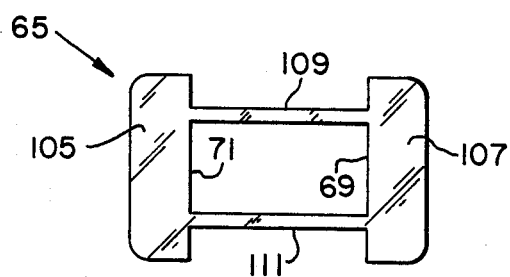
FIG. 5 is a plan view of one type phase or end turn insulator suitable for placement according to the techniques of the present invention.

FIG. 5 illustrates one type of phase insulator for stator core insertion according to the techniques of the present invention. The insulator of FIG. 5 is cut or formed from a sheet of Milar or other insulating material so as to have end turn insulating portions 105 and 107 connected together by relatively more narrow leg portions 109 and 111 with the latter designed to reside in the stator core slots while the end turn insulating portions 105 and 107 lie to either side of the stator core and in between end turn winding layers. FIG. 5 illustrates an insulator where the legs 109 and 111 are formed from the same sheet of material as end turn insulating portions 105 and 107. Insulators having round legs formed, for example, by ultrasonic welding techniques are also known and may be used in practicing the invention. Other insulator configurations are also possible.

Figure 3:
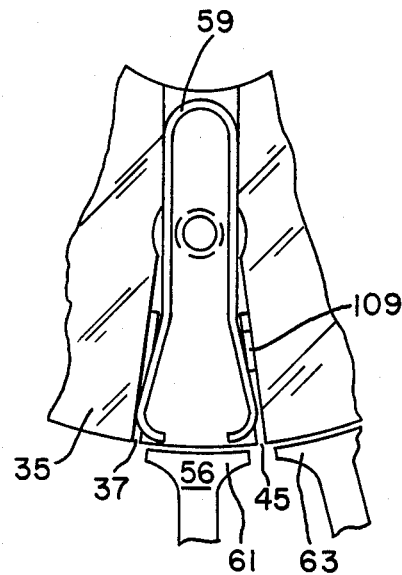
FIG. 3 is an enlarged view of a portion of FIG. 2 including additionally stator tooth portions, a spring retainer and corresponding grasped insulator section.

Either of the pieces 13 or 35 may be contoured as illustrated in FIGS. 2 and 3 to receive an appropriate number of spring retainers in the form of C-shaped spring clips such as 59 of FIG. 3. Thus, when parts 13 and 35 are bolted together, the spring retainers 59 are securely held in position therebetween with the free ends of the spring extending outwardly into slots such as 37 and 45. Under the circumstances, a leg 109 or 111 of an intermediate insulator may be oriented edgewise and passed into the slot to be retained therein by the spring. As seen in FIG. 3, the slot such as 45 is somewhat more narrow than the gap between adjacent teeth 61 and 63 of stator core 27 with those slots extending generally radially so that the legs 109 or 111 of an intermediate insulator are received in the slots and edgewise aligned with the stator core slots for subsequent movement therethrough. Thus, when insulators are positioned on the tool 19, the legs 109 and 111 are twisted about their axis of elongation by about 90° so that those edges may be radially located within the tool and held in that position by spring 59.

In operation then the following sequence of events might take place at a coil placing station. To have a specific example assume that a two pole induction motor is being fabricated and that at a prior station or otherwise in the assembly process the stator core has had slot lining cuffed insulators placed therein or the core slots otherwise insulated as by dipping or coating with a resinous material. The two pole groups of a main or running winding 113 have also previously been positioned in the slotted stator core 27. The two pole groups of a start or auxiliary winding 117 are appropriately positioned between adjacent pairs of the blades or fingers 15 and 15a between corresponding adjacent pairs of wedge guides 17 and displaced about 90° from winding 113 as illustrated in FIG. 1. Insulation positioning tool 19 may be a hand operated tool or may be mechanized and supported on an arm by way of rod 39 if desired. Typically, the insulation positioning member 19 has the phase paper or insulators positioned thereon and the insulation positioning tool with insulators is then loaded into the upper tooling 11 and thereafter the stator core is lowered into position on that tooling 11. The insulation positioning element is manually lowered to a position where the blade alignment tool 51 is beneath the upper ends of the fingers or blades 15 approximately in the position illustrated in FIG. 1. The stator 27 is next lowered over the gauge 47 and downwardly into its coil receiving position illustrated in FIG. 1 on the upper tooling 11. The sequence of events that occur during this stator lowering process is best understood referring primarily to FIG. 4 where certain parts of the coil placer tooling have been omitted for clarity.

Figure 4A:
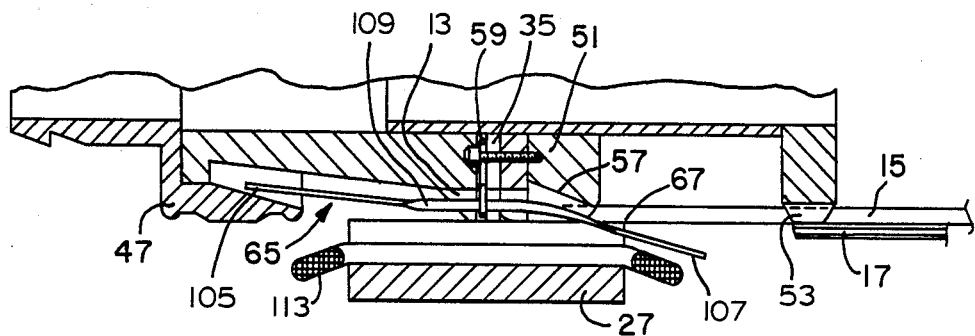
FIGS. 4a, 4b and 4c illustrate the sequential positions of an insulator, coil placing machine tooling, stator guide and blade aligning tool and a partially assembled stator during the positioning of intermediate insulators within the stator core.
Figure 4B:
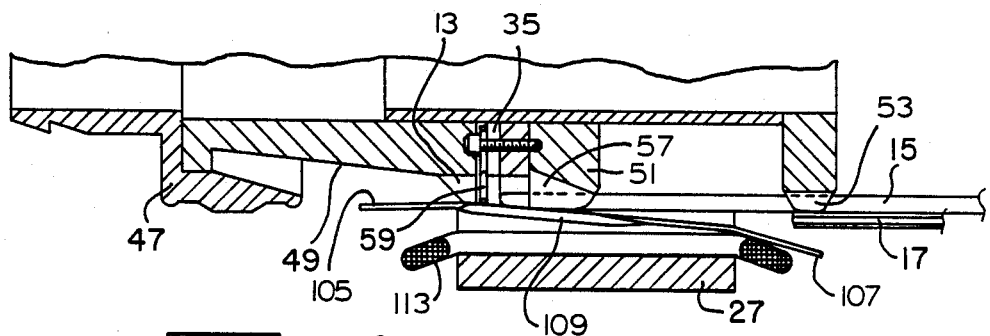
Figure 4C:
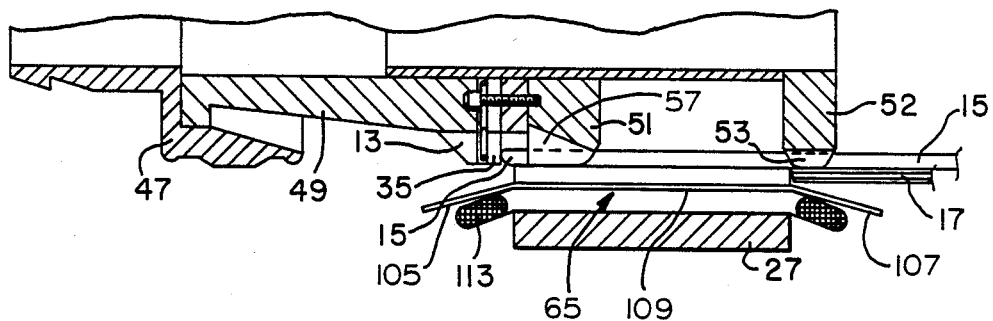

Prior to moving the stator 27 over the gauge 47 and toward the placer tooling, one or more intermediate insulators 65 have been placed about that tool with the leg portions thereof twisted and received in slots such as 37, 45 and 55 and with the upper end turn insulating portion such as 105 thereof resting on the frustoconical region 49. In FIG. 4a stator 27 has been moved toward the right as viewed over gauge 47 and is now in alignment with the intermediate portions 13 and 35. At about this time, several of the stator teeth at one end of the bore 67 engage the surface 69 (FIG. 5) of insulator 65 and additional rightward movement of the stator 27 pulls insulator 65 along with the stator. When the stator 27 reaches the position illustrated in FIG. 4b, the corresponding edge 71 of upper end turn insulating portion 105 engages the more abrupt taper of intermediate portion 13 and surface 71 slides along that taper moving the end 105 of insulator 65 radially outwardly and causing leg portions 109, 111 to move into the appropriate stator core slots as illustrated in FIG. As the stator 27 transitions between the positions illustrated in FIGS. 4b and 4c the insulator 65 moves axially with the stator and at the same time the upper end 105 of that insulator is urged radially outwardly and into the appropriate ultimate location within the stator. Thereafter, stripper 23 is actuated to move upwardly through the stator core bore and insert the coils 117 into the core. Thus, the partially assembled stator first engages surface 69 of end portion 107 of insulator 65 and at a substantially later time comes to rest on the upper ends of the wedge guides 17 as illustrated in FIG. 1. Movement of the stator from this initial insulator engaging position to its final rest position on the wedge guides causes displacement of the insulators from their original locations about tool 19 into the stator core. After those insulators have been appropriately positioned in the stator core, conventional clamps 73 and 75 may be used to hold the stator in position during insertion of the coil 117.

From the foregoing it is now apparent that a novel coil placing device as well as a novel system for positioning coils and insulators in dynamoelectric machine stator cores has been disclosed meeting the objects and advantageous features set out herein before as well as others and that modifications as to the precise configurations, shapes and details may be made by those having ordinary skill in the art without departing from the spirit of the invention or the scope thereof as set out by the claims which follow.

What is claimed is:

1. The method of positioning intermediate insulators radially intermediate certain and other prewound coils within the core slots of dynamoelectric machine stator cores with end portions of said insulators separating end turn portions of the certain and other coils, said coils being placed in selected slots of said cores in a stator assembling machine, said machine being of the type having a plurality of generally circularly disposed parallel extending finger elements for supporting coils, a plurality of wedge guides adjacent portions of the finger elements with ends for engaging one end face of a core, and a stripper reciprocably movable along an axis relative to at least some of the finger elements to engage and move the coils into the core, the method comprising the steps of:
    positioning the certain coils in selected stator ore slots to form a partially assembled stator;
    placing the other coils over selected finger elements;
    engaging a finger aligning portion of a stator gauge and finger alignment tool with free end portions of the finger elements;
    locating intermediate insulators in selected positions about the tool with one end portion of each insulator radially outside the finger elements and the other end portion of each insulator radially within and displaced from the finger element;
    passing a partially assembled stator along the tool and into engagement with the one end portion of each insulator and causing displacement of the insulators from their selected positions and into completely assembled positions in the slots of said stator before said stator reaches its coil insertion position with respect to said finger elements.

2. The method of claim 1 including the steps of clamping the core adjacent the wedge guide ends and initiating stripper motion after the insulators are positioned in the stator core slots.

3. The method of claim 1 wherein axial stator motion induces axial insulator motion, the method including the further step of urging insulator portions radially outwardly during the induced axial motion.

4. The method of claim 3 wherein the urging step includes maintaining the radial position of the one end portion of each insulator while induced axial insulator motion causes radial movement of the other end portion of each insulator.

5. The method of claim 1 wherein the insulator displacement includes movement of the other end portion of each insulator to a position radially outside the finger elements.

6. The method of claim 5 including the step of clamping the core adjacent the wedge guide ends subsequent to the movement of the other end portion of each insulator to a position radially outside the finger elements.

7. A stator gauge and blade aligning tool to be used in apparatus for placing prewound coils in selected slots of slotted dynamoelectric machine stator core having a first portion for engaging blades of a coil placing apparatus, a second portion for axially and radially aligning stator cores with the coil placing apparatus blades, and a portion intermediate the first and second portions for supporting insulators in position to be completely transferred into the slots of a stator core by relative motion between the core and tool before said core assumes its coil insertion position, with respect to said blades and cooperating with the core and insulators to so transfer said insulators.

8. The tool of claim 7 wherein the intermediate portion includes spring retainer means for grasping insulator legs.

9. The tool of claim 7 wherein the intermediate portion includes sloping side wall sections for guiding insulators radially outwardly into a stator core.

10. The tool of claim 7 wherein the intermediate portion includes a plurality of generally radially extending insulation receiving slots for edgewise aligning insulator portions with stator core slots.

11. The tool of claim 10 wherein the first portion includes insulation receiving slots aligned with respective intermediate portion slots.

12. The tool of claim 10 wherein the width of the intermediate portion slots is less than the width of the entrance to a corresponding core slot.

13. The tool of claim 7 wherein the intermediate portion has an outside diameter only slightly less than the diameter of the bore in the stator core.

14. The tool of claim 7 wherein the first portion comprises a pair of axially spaced alignment members with the member more closely adjacent the intermediate portion being slotted for receiving insulator portions.

15. The tool of claim 7 wherein the intermediate portion comprises first and second frustoconical insulation end supports, the first having a gradual taper in the axial direction and the second having a substantially more abrupt taper in the axial direction.

16. A method of positioning intermediate insulators in selected slots of dynamoelectric stator cores with portions of said insulators separating portions of prewound coils, said coils being placed in selected slots of said cores in a stator assembling machine said machine being of the type having a superstructure for receiving intermediate insulators and for facilitating stator core positioning preparatory to coil insertion, the method comprising:
positioning insulators in selected positions about said superstructure and moving the core over the superstructure to engage said insulators and strip said insulators therefrom and out of association with said superstructure thereby urging said insulators outwardly into their assembled positions in respective selected slots before said core assumes its coil insertion position with respect to said superstructure.

17. The method of positioning intermediate insulators within core slots of dynamoelectric machine stator cores, radially intermediate certain and other prewound coils with insulator portions separating end portions of the certain and other coils, said coils placed in selected slots of said cores in a stator assembling machine, said machine being of the type having a plurality of generally circularly disposed parallel extending finger elements for supporting coils, a plurality of wedge guides adjacent portions of the finger elements with ends for engaging one end face of a core, and a stripper reciprocally moveable along an axis relative to at least some of the finger elements to engage and move the coils into the core, the method comprising the steps of:
positioning the certain coils in selected stator core slots to form a partially assembled stator;
placing the other coils over selected finger elements;
engaging a finger aligning portion of a stator gauge and finger alignment tool with free end portions of the finger elements;
locating intermediate insulators in selected positions about the tool with one end portion of each insulator radially outside the finger elements and the other end portion of each insulator radially within and displaced from the finger element;
passing a partially assembled stator along the tool to cause displacement of the insulators from their selected positions axially and outwardly into their assembled positions in the stator core slots with insulator displacement being completed prior to engagement of the one end face of the core with the wedge guide ends.

18. The method of claim 17 including the steps of clamping the core adjacent the wedge guide ends ,and, initiating stripper motion after the insulators are completely in the stator core slots.

19. The method of claim 17 wherein the insulator displacement includes movement of the other end portion of each insulator to a position radially outside the finger elements.

20. The method of claim 19 including the step of clamping the core adjacent the wedge guide ends subsequent to the movement of the other end portion of each insulator to a position radially outside the finger elements.

* * * * *

UNITED STATES PATENT AND TRADEMARK OFFICE
CERTIFICATE OF CORRECTION

PATENT NO. : 4,831,715
DATED : May 23, 1989
INVENTOR(S) : Keith A. Witwer

It is certified that error appears in the above-identified patent and that said Letters Patent is hereby corrected as shown below:

Col. 5, line 65, after "Fig." insert --4c--;

Claim 1, Col. 6, line 43, change "ore" to --core--;

Claim 18, Col. 8, line 49, after "completely" insert --positioned--.

Signed and Sealed this

Sixth Day of February, 1990

Attest:

JEFFREY M. SAMUELS

Attesting Officer

Acting Commissioner of Patents and Trademarks